United States Patent [19]

Sandrick

[11] 3,997,961

[45] Dec. 21, 1976

[54] PORTABLE PRESS DEVICE

[76] Inventor: John A. Sandrick, 2231 W. Chicago Ave., Chicago, Ill. 60622

[22] Filed: Sept. 11, 1975

[21] Appl. No.: 612,305

[52] U.S. Cl. .................................................. 29/256

[51] Int. Cl.$^{2}$ .......................................... B23P 19/04

[58] Field of Search ............ 29/244, 250, 251, 256, 29/264, 266

[56] References Cited

UNITED STATES PATENTS

| | | | |
|---|---|---|---|
| 124,108 | 2/1872 | Anderson | 269/280 |
| 1,511,909 | 10/1924 | Rogness | 29/257 |
| 1,810,884 | 6/1931 | Minor | 29/257 |

*Primary Examiner*—James L. Jones, Jr.
*Attorney, Agent, or Firm*—Hill, Gross, Simpson, Van Santen, Steadman, Chiara & Simpson

[57] ABSTRACT

A portable press device particularly adapted for the removal of wrist pins from engine pistons which consists of a base member configured to be received in a vise and having a top surface contoured to receive a sleeve member having a surface dimensioned to mate with a piston, the sleeve and base having centrally disposed openings therethrough with means for aligning the openings. Web members extending upwardly from the base laterally of the sleeve support a threaded ram member in position above a piston received on the sleeve, the threaded ram member being rotatable to urge a press head into contact with the wrist pin of the piston to force the same downwardly out of the piston through the aligned openings in the sleeve in the base.

9 Claims, 5 Drawing Figures

Fig. 1
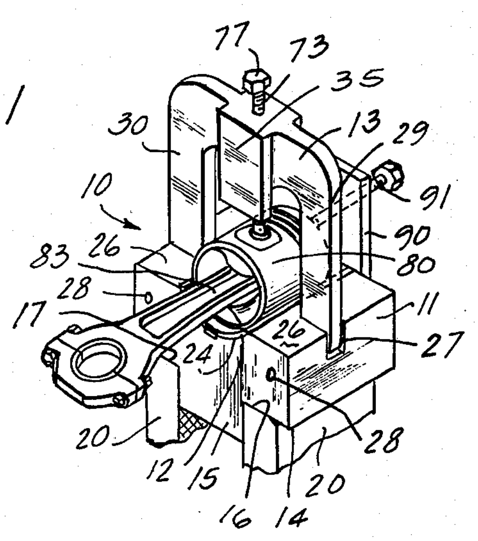
Fig. 4
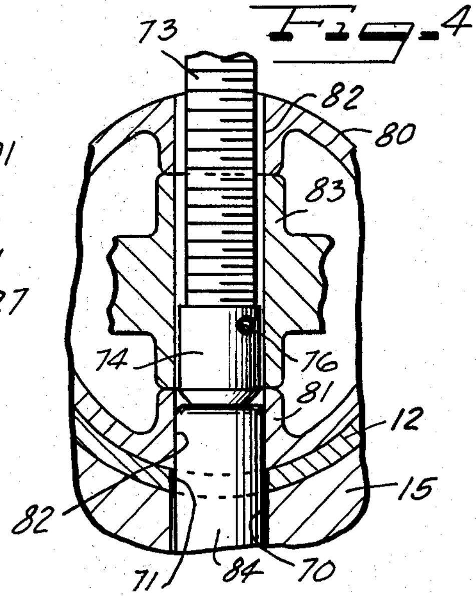
Fig. 2
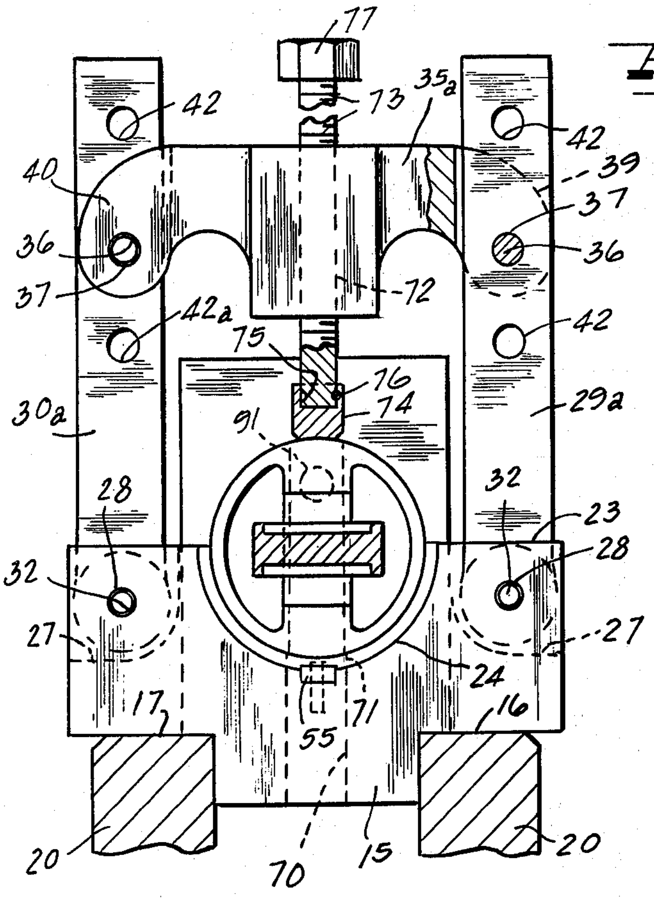
Fig. 3
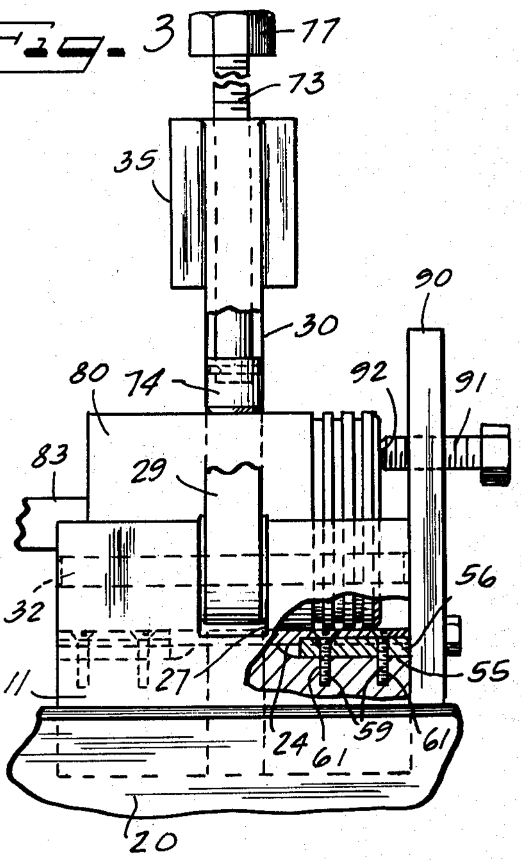
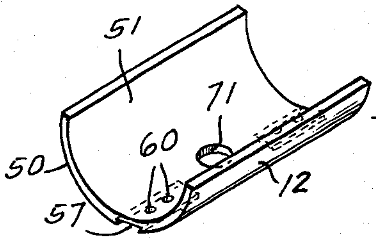
Fig. 5

PORTABLE PRESS DEVICE

BACKGROUND OF THE INVENTION

1. Field of the Invention

This invention relates to tools and more particularly to a portable press device for removal of a piston wrist pin.

2. Prior Art

In the repair and refurbishing of engines, pumps, etc., it is oftentimes necessary to remove the piston from the piston rod. Since the piston rod is generally connected to the piston through a wrist pin, such removal necessitates the removal of the wrist pin.

A common construction has the wrist pin seated in wrist pin bosses interiorly of the piston skirt in a press or an interference fit relationship. Although other fastening means such as snap fasteners may also be used, it is common for the wrist pin to be extremely snugly received in the bores of the wrist pin bosses or in tight bearings received in the bosses. Removal has generally been accomplished by knocking the wrist pin out through the entirety of the piston. Normally the wrist pin bores extend entirely through the piston skirt and it is therefore possible to drive the wrist pin through the piston.

In driving out the wrist pin, it has been common for small repair shops, such as garages and the like, to merely place a rod against the end of the wrist pin and pound it with a hammer. This can damage both the piston and the wrist pin.

It would therefore be desirable to produce an inexpensive press device which would effectively drive the wrist pin through the piston while maintaining proper alignment between the driving means and the piston and wrist pin.

SUMMARY OF THE INVENTION

My invention provides a portable, inexpensive press which is specifically adapted to drive the wrist pin from a piston. The press consists of a base device which is dimensioned to be received in a standard bench vise and which has a top surface with a central arcuate channel therein. The channel is dimensioned to receive one of a plurality of different sized sleeve members, the sleeve members having an undersurface interfitting with the channel and a top surface sized to receive a given piston. Indexing means align the sleeve with the base and a bore through the base is alignable with a bore in the sleeve.

Web members extend away from the base and are joined through a transverse bridge member positioned in spaced relation to the base. The bridge member and web members form a yoke and the bridge member is equipped with a centrally positioned threaded bore. A threaded rod extends through the bore in alignment with the bores of the sleeve and the base. Thereafter insertion of a piston with the wrist pin and wrist pin bores aligned with the threaded bore and the bores in the sleeve and the base will allow removal of the wrist pin by a press member threaded through the bore of the bridge. The press member consists of a threaded rod having a rotatable head for engagement with the wrist pin, the rod having a bolt head which can be driven by a wrench device.

It is therefore an object of this invention to provide an inexpensive press device for removing wrist pins from pistons.

It is another and more specific object of this invention to provide an inexpensive press device for removing wrist pins from pistons which includes a base with a bore therethrough, the base receiving one of a plurality of sleeves configured to cradle a piston, the sleeve having a bore alignable with the base bore, the base carrying a pressing device aligned with the bores and spaced from the sleeve a distance greater than the diameter of the piston, the press device being movable towards the base.

It is another object of this invention to provide a press device for removing wrist pins from pistons which is adaptable to a large variety of piston sizes and which will effectively remove the wrist pin without damage to the piston pin bores.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a perspective, partly sectional view of the portable press of this invention received in a vise.

FIG. 2 is a side elevational view, partially in section, of the device of FIG. 1, illustrating a modification thereof.

FIG. 3 is a side elevational view partially in section of the device of FIG. 1 rotated 90° from the view of FIG. 2.

FIG. 4 is a fragmentary sectional view of the press member as engaged in removing a wrist pin from a piston.

FIG. 5 is a perspective view of a sleeve receivable in the press of this invention.

DESCRIPTION OF THE PREFERRED EMBODIMENTS

FIG. 1 illustrates the portable press 10 of this invention. The press consists of a base member 11, a sleeve 12 and a top structure 13. As illustrated in FIG. 1, the base has a bottom surface 14 which has a central tongue 15 projecting downwardly therefrom providing ledge shoulders 16 and 17 on either side thereof. This allows the press 10 to be received in a standard vise between the jaws 20 thereof with the jaws gripping the sides of the tongue 15 and the shoulders 16 and 17 resting on the tops of the jaws. This provides a firm fixture for the otherwise portable press. The top surface 23 of the base has a central groove 24 therein running the full depth of the base and, in the embodiment illustrated aligned with the tongue 15. The groove provides two coplanar top surfaces 26 of the base on either side thereof. Notches 27 extend into the base from the surfaces 26 and are open to the adjacent side surfaces. The notches intersect with bores 28 extending through the base parallel to the channel 24. Bottom portions of webs 29 and 30 are received in the notches 27, the webs having bores aligned with the bores 28. Rods 32 extend through the bores 28 and the bores in the bottom sections of the webs 29 and 30 to lock the webs to the base. The rods 32 are removable to removal of the webs 29 and 30 whereby the press device is extremely compact and disassemblable for storage.

In the embodiment illustrated in FIG. 1, the webs are integral with a transverse bridge section 35 extending between the two webs whereby the combination of webs and bridge section form a substantially U-shaped upstanding yoke.

In the embodiment illustrated in FIG. 2, the webs 29*a* and 30*a* are separate from the bridge section 35*a* and the bridge section 35*a* is attachable to the webs at various distances from the base by means of fastening devices 36 which are received in openings 37 extending through sloted ends 39 and 40 of the bridge 35*a*. The slots in the ends allow insertion of the webs 29*a* and 30*a* thereinto, the webs being equipped with a series of spaced openings 42 which are alignable with the openings 37. The fastening means may consist of rod members such as the rod members 32 or may be threaded bolts with one side of the notched ends being threaded, or other types of fastening means.

It is to be understood that the attachment of the webs to the base, as illustrated, utilizing the rods 32 and the bores 28 may also be modified as desired. As an example of a modification, the entire web and bridge system can be hingeably attached to the base allowing the web and bridge system to be folded for storage or, in the alternative, can be permanently attached to the base as by means of welding or the like. However, it is to be appreciated, that it is an advantage of the presently disclosed portable press that it is collapsible for storage.

As best illustrated in FIG. 5, the sleeve 12 is a tubular half section having an outer curved face 50 dimensioned to be received in the channel 24. It is to be understood that the channel 24 can be other than circular, for example rectangular in which case the sleeve 12 would have an outer surface corresponding thereto. The sleeve has an inner surface 51 which is dimensioned to receive a given piston size. For the purposes of this invention, the channel 24 will have major dimensions sufficient to receive all standard sized pistons. Therefore, with the use of variously inner surface dimensioned sleeves, the press is adaptable to a wide variety of piston sizes and shapes.

As best shown in FIG. 3 the channel 24 has grooves 55 extending inwardly from the end faces of the base. The grooves receive tongue members 56 which project slightly above the bottom of the channel 24. These tongue members index with grooves 57 at the ends of the sleeves to properly position and align the sleeves within the channel. Removable fastening means such as screws 59 may be used to temporarily fix the sleeve in the channel, the sleeve being provided with non-threaded openings 60 alignable with threaded openings 61 in the bottom of the channel for that purpose. It should be also appreciated, that wheredesired, the tongue members 56 may be formed integrally with the base, in the manner of ribs and can be dimensioned and designed to lock the sleeves properly in place without the necessity of fasteners such as screws 59.

The base, sleeve and bridge members have aligned bores therethrough. The bore 70 in the base extends from the bottom surface of the tongue 15 to the channel 24 and is alignable with a correspondingly sized bore 71 in the sleeve extending from the outer face 50 through to the inner face 51. These openings are aligned, when the sleeve is properly positioned in the channel with a bore 72 through the bridge. The bore 72 is threaded and receives a bolt member 73 which functions as a press or pusher ram. The end of the bolt member 73 below the bridge and opposed to the base is equipped with a pusher tip 74 which, preferably, is attached for rotation on the bolt end 75, as by means of a groove and lock pin 76. The opposite end 77 of the bolt is equipped with a standard bolt head. Therefore, rotation of the bolt head, as by means of the use of a socket wrench or the like, will cause the tip 74 to move towards and away from the base. The tip 74 is dimensioned to be insertable through a piston interiorly of the wrist pin bores.

As shown in FIG. 4, the standard pistons 80 have internal bosses 81 with wrist pin bores 82 therein aligned with each other. The piston rod 83 is attached to the piston 80 by means of a wrist pin 84 which is normally press or interference fitted in the bores 82. The tip 74 is preferably slightly smaller than the wrist pin 84. It is to be understood, that different sizes of tips 74 can be provided with the press for use with different sized piston wrist pins if desired.

In one form of the invention, a backing plate 90 or the like can be attached to one end face of the base in the area of the channel and can be equipped with adjusting means 91 such as bolts, which allow the accurate placement of a stop face 92 overlying the channel 24. This is particularly advantageous when all of the pistons of a multicylinder engine are to be separate from their piston rods.

OPERATION OF THE DEVICE

The portable press of this invention is operated in the following manner. After assembling the webs to the base and, in the embodiment of FIG. 2, the bridge section to the webs, a sleeve 12 dimensioned to receive the piston to be worked on is attached in the channel 24. Thereafter, the bolt 73 is rotated to lift the tip 74 a distance from the base at least equal to the diameter of the piston and the piston is inserted in the sleeve with the wrist pin aligned with the opening 71 in the sleeve. If a plurality of similarly sized pistons are to be worked upon, the adjustable stop 82 is brought into contact with the head of the piston after proper alignment of the piston wrist pin with the opening 71.

Thereafter, rotation of the bolt 73 will cause the tip 74 to contact the wrist pin 84 and continued rotation, will easily, accurately, and safely push the wrist pin through the piston, either entirely or at least to the point illustrated in FIG. 4 where the piston rod can be removed. If the wrist pin is driven entirely through the piston, it will drop freely through the bore 70. Thereafter unthreading of the bolt 73 will allow the piston to be removed from the press.

Although I have shown the press device as consisting of a threaded bolt 73 received in a threaded bore 72, it is to be understood that other modifications, such as hydraulic, or pneumatic rams may be utilized. Many such modification means equivalent to the sliff bolt 73 and long threaded bore 72, should be provided to maintain alignment of the ram member with the bore in the base during ejection movement of the ram member.

It therefore can be seen from the above that my invention provides a portable press specifically adapted for removal of wrist pins from pistons, the press is equipped with a base member dimensioned to be received in a standard vise, and a sleeve member having a cradling surface dimensioned to receive a specifically sized piston, the sleeve and base having aligned openings through which a wrist pin can be ejected from a piston on the sleeve. The base is equipped with a yoke or web structure which supports a movable ram or press member positioned above the sleeve in vertical alignment with openings in the sleeve and base. The ram member is movable towards and away from the base to force the wrist pin from a piston received in the sleeve below the ram member.

Although the teachings of my invention have herein been discussed with reference to specific theories and embodiments, it is to be understood that these are by way of illustration only and that others may wish to utilize my invention in different designs or applications.

I claim as my invention:

1. A press device for removing wrist pins from a piston comprising: a base member having a channel in a top surface thereof and a base bore extending therethrough from a channel bottom, a removable sleeve member having a bottom surface dimensioned to be closely received in the channel and a top surface dimensioned to closely receive a piston head with a sleeve bore extending between the sleeve top and bottom surfaces alignable with the base bore, a ram member movably attached to a support means carried by the base, the support means spaced from the channel providing an open area above a sleeve received in the channel for receipt of a piston head in the sleeve, the ram member aligned with the base and sleeve bores and movable from a position spaced from the channel towards the channel, and means maintaining alignment of the ram member during movement towards the channel.

2. A device according to claim 1 wherein means are provided to maintain proper alignment of the sleeve and the channel with the bores aligned.

3. The device of claim 2 wherein the support means is detachable from the base.

4. The device of claim 3 wherein the support means includes a bridge member extending transversely of the channel and connected to the base through upstanding web members affixed to the base on opposite sides of the channels, the bridge member overlying the bores and carrying the ram member.

5. The device of claim 4 wherein the bridge member is attachable to the webs at a plurality of points along the length of the webs variously spaced from the base.

6. The device of claim 4 wherein the ram member is a bolt member received in a threaded bore in the bridge, the threaded bore aligned with the base bore, the bolt having an end opposed to the base with a rotatable tip thereon.

7. The device of claim 2 wherein adjustable base carried means are provided for properly longitudinally positioning a piston head in the sleeve with the wrist pin of the piston aligned with the bores.

8. A portable press adapted to be clamped in a bench vise for removing wrist pins from pistons comprising: a base adapted to rest on the jaws of a vise and having a depending rib adapted to be clamped by said jaws, said base having a piston receiving open end, open top, semicylindrical recess, a yoke detachably mounted in an upright position on said base having legs straddling said recess, a bolt threaded through said yoke above the recess, a semicylindrical sleeve sized for snugly supporting a piston removably mounted in said recess, said sleeve and said base having registering bores therethrough opening between the vise jaws when the base is clamped in a vise, adjustable means carried at one end of the recess for engaging a piston head of a piston in the sleeve to position a wrist pin hole of the piston over the bore of the sleeve and base whereby rotation of the bolt to advance it against a wrist pin in the piston will eject the wrist pin from the piston through said sleeve and base bores.

9. The device of claim 8 wherein alignment means are provided for fixedly aligning the sleeve in the recess.

* * * * *